United States Patent
Tsuyuguchi et al.

(10) Patent No.: US 7,654,122 B2
(45) Date of Patent: Feb. 2, 2010

(54) PROCESS FOR STRAIGHTENING A TUBE

(75) Inventors: Satoshi Tsuyuguchi, Osaka (JP); Kouichi Kuroda, Osaka (JP); Tomio Yamakawa, Osaka (JP)

(73) Assignee: Sumitomo Metal Industries, Ltd., Osaka-shi (JP)

( * ) Notice: Subject to any disclaimer, the term of this patent is extended or adjusted under 35 U.S.C. 154(b) by 0 days.

(21) Appl. No.: 12/247,912

(22) Filed: Oct. 8, 2008

(65) Prior Publication Data
US 2009/0064752 A1 Mar. 12, 2009

Related U.S. Application Data

(63) Continuation of application No. PCT/JP2007/058157, filed on Apr. 13, 2007.

(30) Foreign Application Priority Data

Apr. 14, 2006 (JP) ............................. 2006-111893

(51) Int. Cl.
  *B21D 1/02* (2006.01)
  *B21B 19/02* (2006.01)
(52) U.S. Cl. ............................................. 72/98; 72/99
(58) Field of Classification Search ............ 72/95, 72/98, 99, 100, 31.01
See application file for complete search history.

(56) References Cited

U.S. PATENT DOCUMENTS 2,655,194 A * 10/1953 Nilsson ........................ 72/98

FOREIGN PATENT DOCUMENTS

JP 55-103222 8/1980

(Continued)

OTHER PUBLICATIONS

International Preliminary Report on Patentability from the International Bureau of WIPO, dated Nov. 17, 2008.

(Continued)

*Primary Examiner*—Dana Ross
*Assistant Examiner*—Debra M Sullivan
(74) *Attorney, Agent, or Firm*—Marshall, Gerstein & Borun LLP

(57) ABSTRACT

In straightening a tube using a roll straightening machine provided with drum type straightening roll pairs vertically opposingly disposed, at least an outer layer portion of a roll main body is made of elastic material having spring type hardness Hs (JIS K 6301 A type) of 50 to 100 in at least three pairs of straightening rolls on an outlet side of the roll straightening machine, and an offset amount is imparted to a tube engaged in the three pairs, at least, of straightening opposing rolls such that η defined by an equation (1) ranges from $1.0 \times 10^{-3}$ to $1.5 \times 10^{-3}$. The offset amount is set at three positions along a tube axis where the upper and lower rolls of each pair horizontally cross. Therefore, an S/N ratio can be enhanced in an eddy current test from inside of the tube to improve inspection efficiency, and excellent quality accuracy can be ensured in a heat transfer tube used in a steam generator and the like.

[Formula 1]

$$\eta = \frac{1}{R} \times \left(\frac{d}{2}\right) \quad (1)$$

where a relationship of $R=(\delta^2+L^2)/2\delta$ holds, assuming that d (mm) is a tube outside diameter, L (mm) is a roll stand span of the roll straightening machine, and δ (mm) is an offset amount.

1 Claim, 4 Drawing Sheets

FOREIGN PATENT DOCUMENTS

| | | |
|---|---|---|
| JP | 60-184424 | 9/1985 |
| JP | 61-286205 | 12/1986 |
| JP | 2000-317521 | 11/2000 |
| JP | 2004-330297 | 11/2004 |

OTHER PUBLICATIONS

International Search Report in corresponding PCT/JP2007/058157 dated Jun. 5, 2007.

Written Opinion of the ISA in corresponding PCT/JP2007/058157 dated Jun. 5, 2007 in Japanese language only.

* cited by examiner

PROCESS FOR STRAIGHTENING A TUBE

TECHNICAL FIELD

The present invention relates to a tube straightening process and a tube production method, in which tube bending in an axial direction and distortion of cross section (hereinafter referred to as ovality) are suppressed. More particularly, the present invention relates to a tube straightening process in which generation of the ovality associated with bending correction is suppressed while tube bending correction accuracy is ensured, whereby a ratio (so-called S/N ratio) of signal to base noise in flaw detection can be enhanced in an eddy current test from inside of a tube by inserting an inner-probe and a tube production method in which the tube straightening process is used.

BACKGROUND ART

A U-shaped heat transfer tube utilized in a heat exchanger, such as a steam generator and a feed water heater, which is used in a thermal or nuclear power plant is produced by bending a small-diameter and long-length heat transfer tube with an outside diameter of 30 mm or less into a U-shape. In the U-shape heat transfer tube, an inspection is performed to detect flaws by the eddy current test from the tube inside as a pre-service inspection after the U-shaped heat transfer tube is assembled in the heat exchanger or as an in-service inspection or a periodic inspection after the U-shaped heat transfer tube is in-service for a certain period. The eddy current test from the tube inside applies strict test criteria because of the need to ensure safety of nuclear power plant facilities.

The eddy current test applying the test criteria similar to that of the pre-service inspection or periodic inspection is also required for an inspection before shipment after the heat transfer tube is produced. As a result of the eddy current test, the heat transfer tube which fails the test criteria becomes nonconforming material. Even within the test criteria, it is necessary that the result of the eddy current test be recorded in each tube while correlated with relevant positions in an axial direction of the heat transfer tube.

Usually the heat transfer tube is produced through cold working such as cold drawing and cold rolling and a heat treatment using a mother tube produced by hot extrusion. The bends in an axial direction and ovality of the tube, generated after the cold working and heat treatment, are corrected during a subsequent finishing process using a roll straightening machine. Not only many heat transfer tubes having small diameters are used in the heat exchanger, but also an installation space of the heat transfer tube becomes narrowed with miniaturizing heat exchanger. When the bend is generated in the heat transfer tube, a trouble such as interference with other parts is generated in assembling the heat transfer tube into the heat exchanger. Accordingly, it is necessary to ensure bend correction accuracy in the roll straightening machine.

Usually a cross roll type straightening machine, in which plural drum type rolls are combined, is adopted in a configuration of the roll straightening machine used in the straightening. There are many configurations in the cross type roll straightening machine according to a combination of the number of rolls, a layout (vertical and horizontal directions), and roll arrangement (opposing type and zigzag type). The roll straightening machine in which the rolls are disposed as opposed to each other is used in the step of finishing up the heat transfer tube.

FIG. 1 is a view showing an example of the roll layout of the cross roll type straightening machine. Plural pairs of straightening rolls Ra and Rb (collectively referred to as R) are provided in the roll straightening machine. The pairs of straightening rolls Ra and Rb each are vertically disposed as opposed to each other in such a state that directions of rotating axes cross in a plan view (actually, cross-wise pass each other in a spaced-apart relation in a front view). In the roll layout of FIG. 1, three pairs of straightening rolls Ra1 and Rb1, Ra2 and Rb2, and Ra3 and Rb3 are disposed on an inlet side, the center, and an outlet side respectively, the rolls of each pair being opposed to each other, and auxiliary roll Rc is provided at an exit of the outlet-side straightening rolls. Usually the roll straightening machine having such roll layout of FIG. 1 is called (2-2-2-1) type straightening machine.

An opposing rolls clearance and a cross angle can separately be adjusted in each roll of a straightening roll pair Ra1 and Rb1. A height position in a vertical direction of a first pair of straightening rolls Ra1 and Rb1 and a height position of a second pair of straightening rolls Ra2 and Rb2, adjacent to the first pair, can be also adjusted separately.

In the bend correction, a cross angle θ of the rotating axis of each straightening roll R to a tube to be corrected 1, that is, a roll angle is adjusted such that contact faces of the tube to be corrected 1 fit in contours of the straightening roll, the opposing rolls clearance between the straightening rolls Ra1 and Rb1 is set slightly smaller than an outside diameter of the tube to be corrected 1 to impart a crush, and an offset is imparted to straighten the bend and correct ovality by adjusting the crush amount of the second pair of straightening rolls Ra2 and Rb2, adjacent to the first pair.

Since high rigidity and wear-resistant properties are required for straightening rolls, the straightening roll is made of tool steel or ceramic, and the surface of the straightening roll is formed by a curved line constituting a drum shape in consideration of a contact surface with a tube to be corrected so as to enable the tube having the outside diameter within a predetermined range to be straightened. After the heat treatment, the heat transfer tube whose bends and ovality are corrected by the roll straightening machine is subjected to a process such as cutting, and the inspection before shipment is performed to the heat transfer tube by the eddy current test from the tube inside.

FIG. 2 is an example of a chart showing result of the eddy current test from inside of the heat transfer tube. As shown in FIG. 2, Signal S from Standard Flaw defined in the test criteria and signal N having a predetermined period P are shown in the chart. The signal N is called base noise, and is caused by a minute dimensional fluctuation generated in an axial direction of the heat transfer tube. It is necessary that the magnitude of the signal N be decreased as much as possible in order not to mistake the signal N for a signal caused by the detected flaw and in order to swiftly judgment whether the signal indicates the flaw to thereby improve the inspection efficiency. Hereinafter, a ratio of Signal S from Standard Flaw to Noise N is referred to as "S/N ratio".

For example, in the case where automatic judging is made based on the signals shown in the chart during the eddy current test from tube inside, the large noise, that is, the small S/N ratio hides a signal from a small defect behind the base noise, which makes distinction between the small defect signal and the base noise harder.

Therefore, an inspector visually observes the result of the automatic sentencing in the eddy current test. When a doubtful signal is generated, the portion where the doubtful signal is generated is tested again at a lower speed to distinguish between the small defect and the base noise, thereby lowering the inspection efficiency.

As described above, the base noise is caused by the minute dimensional fluctuation generated in an axial direction of the heat transfer tube. Therefore, in order to reduce the base noise, it is necessary to suppress the dimensional fluctuation such as bends and ovality in an axial direction of the heat transfer tube, that is, to enhance the dimensional accuracy along an axial direction of the heat transfer tube.

Usually, in straightening the tube by the roll straightening machine, as shown in FIGS. 3 to 5, it is necessary that the roll angle, crush amount, and offset amount which are the setting conditions be determined to suppress the dimensional fluctuation such as the bends and the ovality in an axial direction of the heat transfer tube.

FIG. 3 is a view explaining a relationship between the roll angle of the roll straightening setting conditions and a corresponding travel distance of the tube to be corrected. Assuming that d (mm) is an outside diameter of the tube to be corrected 1 and θ (°) is an angle (hereinafter referred to as "roll angle") formed by an axial center of the tube to be corrected 1 and the rotating axis of the straightening roll R, a travel distance (hereinafter referred to as "feed pitch") M (mm) of the tube to be corrected 1 per one rotation of the straightening roll R is defined by the following equation (2):

$$M = \pi \cdot d \cdot \tan \theta \quad (2)$$

FIG. 4 is a view explaining the crush amount of the roll straightening setting conditions. As shown in FIG. 4, the tube to be corrected 1b, to which the crush is applied by the roll straightening, is rolled, while being pressed, and deformed into an elliptic shape. A crush amount ε (mm) is indicated by a difference between an outside diameter d of a pre-deformation tube to be corrected 1a and an opposing rolls clearance s of the straightening rolls Ra and Rb, and corresponds to a rolling reduction of the outside diameter of the tube to be corrected 1. The bend correction is performed to the tube to be corrected 1 by repeatedly rolling while pressing the tube to be corrected 1 across the total length. The crush amount ε (mm) is set by raising/lowering the straightening roll Ra.

FIG. 5 is a view explaining the offset amount of the roll straightening setting conditions. An offset amount δ (mm) is indicated by a deflection in crush/roll height between the central pair of straightening rolls Ra2 and Rb2, and the bend correction is performed by imparting a bending stress to the tube to be corrected 1. The crush height is set by raising the straightening roll Rb2, thereby adjusting the offset amount δ (mm).

As described above, in performing the straightening by the roll straightening machine, it is necessary that a certain level of load such as the crush and the offset be applied onto the tube in order to straighten the bends. However, sometimes dimensional fluctuation such as the ovality associated with the load becomes significant.

Specifically, in the conventional process for straightening the heat transfer tube such as the steam generator and the feed water heater, the tube having the excellent pre-straightening dimensional accuracy, for example, the heat transfer tube to which drawing is performed with a high-pressure drawing machine, sometimes increases in ovality after straightening to deteriorate the S/N ratio compared with the cross-sectional shape of the pre-straightening tube due to the straightening performed by the roll straightening machine.

On the other hand, when the bend correction is insufficiently performed in straightening the heat transfer tube, the interference with other component is frequently generated in assembling the heat transfer tube into the heat exchanger, which makes the assembly work difficult. Accordingly, in straightening the heat transfer tube, it is necessary that the dimensional fluctuation associated with the bend correction be suppressed while the tube bend correction accuracy is ensured. Therefore, there have been conventionally proposed various straightening techniques.

In a straightening process disclosed in Japanese Patent Application Publication No. 61-286025, in order to perform the straightening without deteriorating roundness of the inner surface of the tube used in a hydraulic cylinder tube and the like, the offset is imparted to the tube using a cross opposing type roll straightening machine, and the straightening is performed while a predetermined load which does not substantially impart the crush is applied to the tube.

In a straightening process disclosed in Japanese Patent Application Publication No. 2004-330297, in order to suppress roundness deviation in turning inner and outer surfaces of a cut ring used in a bearing race or the like, a residual stress generated in the tube after the straightening is lowered by a multi-roll straightening machine in which the offset amount is set at 12 mm or more and the crush amount is set at 0.6 mm or less, thereby obtaining a seamless steel tube having little dimensional fluctuation during the turning and excellent roundness.

In a process disclosed in Japanese Patent Application Publication No. 60-184424, the roll offset amount and the crush amount are determined from a relationship between an index indicating a plastic region of the tube and a presumptive offset and crush amounts, picked in advance, and the roll position is set to perform the tube straightening, thereby improving the tube bend and/or roundness.

However, in the straightening processes proposed in Japanese Patent Application Publication Nos. 61-286025, 2004-330297, and 60-184424, it is not intended that the ovality or bends in an axial direction of the tube be corrected in order to enhance the S/N ratio in the eddy current test from the tube inside.

In a heat transfer tube production method disclosed in Japanese Patent Application Publication No. 2000-317521, by using a straightening roll in which at least an outer layer portion of a roll main body is made of elastic material having hardness Hs of 50 to 100 in a spring hardness test (A type) defined by JIS K 6301, the test can be made with a high S/N ratio in the eddy current test from the tube inside.

Although the heat transfer tube obtained by the production method of Japanese Patent Application Publication No. 2000-317521 has the S/N ratio higher than that of the conventional technique, the inspection efficiency does not reach a level satisfying manufacturing-related personnel, and there is still large room to be improved. That is, in order to enhance the inspection efficiency, there is the need to improve the dimensional accuracy of the post-straightening heat transfer tube to enable the test with the higher S/N ratio.

DISCLOSURE OF THE INVENTION

As described above, in order to enhance the S/N ratio, it is necessary to suppress the minute dimensional fluctuation generated in an axial direction of the tube. As the dimensional fluctuation in the tube is increased, the base noise is increased during the eddy current test, and the distinction between signals and base noises is hardly made in detecting the extremely small defect in the tube inner surface.

In view of the problem relating to the straightening of the tube which is the target of the eddy current test with inner coil method, an object of the present invention is to provide a tube straightening process in which, by properly managing the straightening operation as a finishing process after the tube cold working, the generation of the dimensional fluctuation such as the ovality associated with the bend correction is suppressed while the tube bend correction accuracy is ensured, whereby the S/N ratio can be enhanced in the eddy current test from the tube inside, and a tube production method in which the tube straightening process is used.

After various studies on the relationship between the roll straightening conditions and the S/N ratio in the eddy current test from the tube inside were made to solve the problem, the inventors focused attention on the fact that the constant period P (hereinafter referred to as "noise pitch") of the base noise N emerging in the eddy current test substantially matches with the tube feed pitch M of the straightening roll R shown in FIG. 3.

On the basis of the fact, the inventors investigated an influence of the post-roll straightening tube on the S/N ratio and possibly remaining bends using the heat transfer tube, when the crush amount ε and the roll angle θ of the roll straightening conditions were changed while the offset amount δ was kept constant (10 mm). The seven-roll (2-2-2-1) type straightening machine shown in FIG. 1 was used as the roll straightening machine, and a roll covered with a urethane resin having the spring type hardness Hs of 95 was used as the outlet-side three pairs of straightening rolls. A Ni-base alloy of ASME SB-163 UNS NO 6690 was used as a testing material, and a tube with the finished dimension comprising an outside diameter of 19.14 mm, a wall thickness of 1.125 mm and a length of 10000 mm obtained through the cold drawing by the high-pressure drawing machine was used. Table 1 shows the setting conditions of the roll straightening machine and results.

TABLE 1

| Roll Angle θ (°) | Crush amounts ε(mm) | | | |
|---|---|---|---|---|
| | 2.6/2.7/2.7 | | 2.8/3.0/3.0 | |
| | S/N ratio | Remaining Bends | S/N ratio | Remaining Bends |
| 30.5 | 18 | o | 16 | o |
| 31.0 | 18 | o | 13 | o |
| 31.5 | 26 | o | 21 | o |
| 32.0 | 24 | o | 25 | o |

Note 1)
The offset amount was set at 10 mm.
Note 2)
The crush amounts indicate inlet side/center/outlet side.

The remaining bends shown in Table 1 is obtained by inspecting, in particular, the bends near a tube end portion (hereinafter also referred to as "nose bend") as the post-straightening tube bends. The nose bend is a bend after the bends generated in the cold working such as the cold drawing and the cold rolling and the subsequent heat treatment is straightened by the roll straightening machine. In the remaining bends of Table 1, "o" indicates good bend correction in which a bend amount over a distance from a tube end to the position of 1000 mm away from the end becomes 1 mm or less, and "x" indicates insufficient bend correction in which the bend amount exceeds 1 mm.

In the S/N ratio, the eddy current test was performed from the tube inside under conditions of frequency of 550 kHz and differential bobbin coil type, a drilling through-hole of 0.66 mmφ was used as Standard Flaw, and a minimum value in overall S/N ratios that are derived by segmenting the total length of the tube into each segment of one feet and assessing a S/N ratio in each segment was set as the S/N ratio of the tube. In the case where the crush amount E and the roll angle θ were changed while the offset amount δ was kept constant, although the good correction was performed with little remaining bends for all the conditions, the S/N ratio could not reach 30 or more, which was the target value.

Then, the tube was straightened by changing the offset amount while the crush amount and the roll angle were kept constant, and it was found that setting the offset amount within a proper range can eliminate the nose bend to ensure the bend correction accuracy after the tube straightening and enhance the S/N ratio to 30 or more, which is the target value in the eddy current test from the tube inside.

The present invention is completed based on the above-described findings, and the gist thereof includes (1) a tube straightening process and (2) a tube production method therewith.

(1) A tube straightening process using a roll straightening machine in which drum type straightening roll pairs are disposed, the rolls of each pair being vertically opposed to each other, in a manner such that directions of rotating axes of rolls in each pair are horizontally oppositely diverted so as to horizontally cross, is characterized in that, in at least three pairs of straightening opposing rolls on an outlet side of the roll straightening machine, at least an outer layer portion of a roll main body for each roll is made of elastic material having spring type hardness Hs (JIS K 6301 A type) of 50 to 100, and an offset amount is imparted to a tube engaged in at least three pairs of straightening opposing rolls on the outlet side such that η defined by a following equation (1) ranges from $1.0 \times 10^{-3}$ to $1.5 \times 10^{-3}$, the offset amount being set at each of three positions along the tube axis where the upper and lower rolls of each pair horizontally cross;

Where a relationship of $R=(\delta^2+L^2)/2\delta$ holds, given that d (mm) is a tube outside diameter, L (mm) is a roll stand distance of the roll straightening machine, and δ (mm) is an offset amount.

[Formula 1]

$$\eta = \frac{1}{R} \times \left(\frac{d}{2}\right) \quad (1)$$

(2) A tube production method is characterized in that at least final roll straightening in tube processing steps is performed by the tube straightening process according to the above aspect of (1).

BEST MODES FOR CARRYING OUT THE INVENTION

Figure 1:
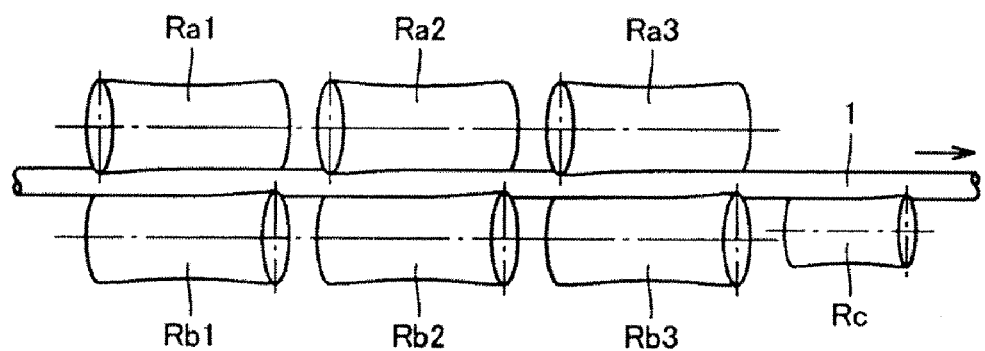
FIG. 1 is a view showing an example of a roll layout of an cross roll type straightening machine.
Figure 2:
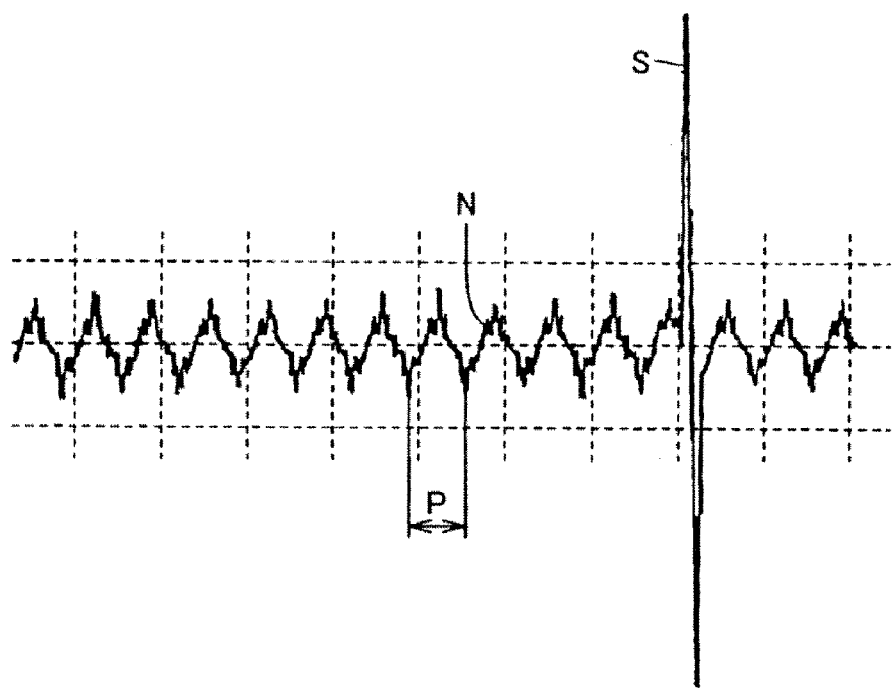
FIG. 2 is an example of a chart showing result of eddy current test from inside of a heat transfer tube.
Figure 3:
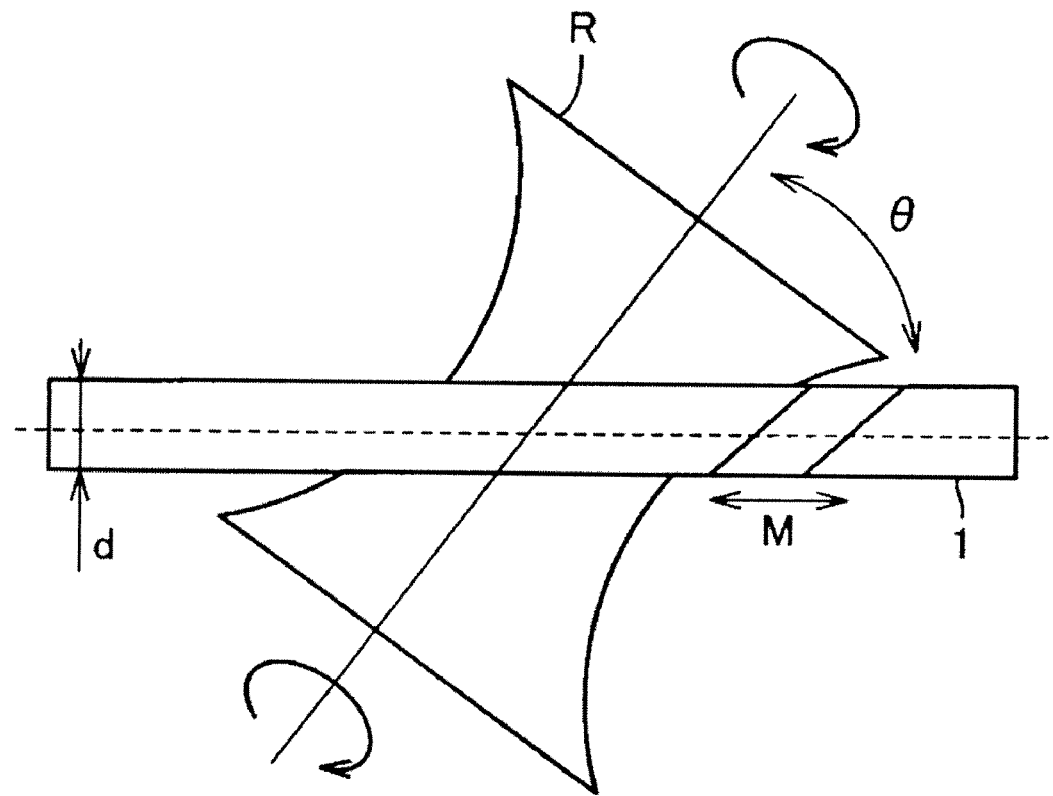
FIG. 3 is a view explaining a relationship between a roll angle of roll straightening setting conditions and a corresponding travel distance of a tube to be corrected.
Figure 4:
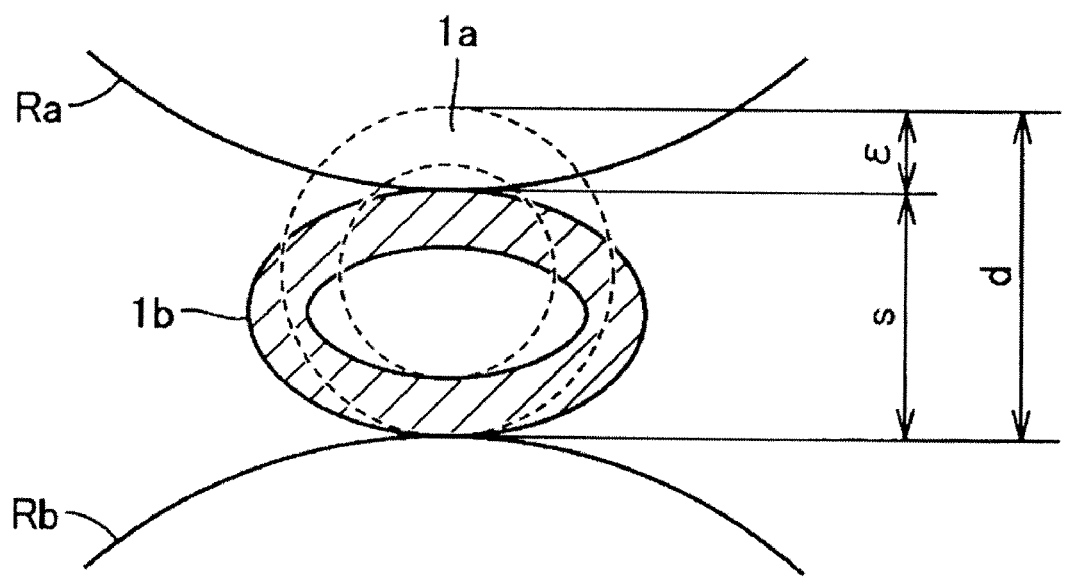
FIG. 4 is a view explaining a crush amount of roll straightening setting conditions.
Figure 5:
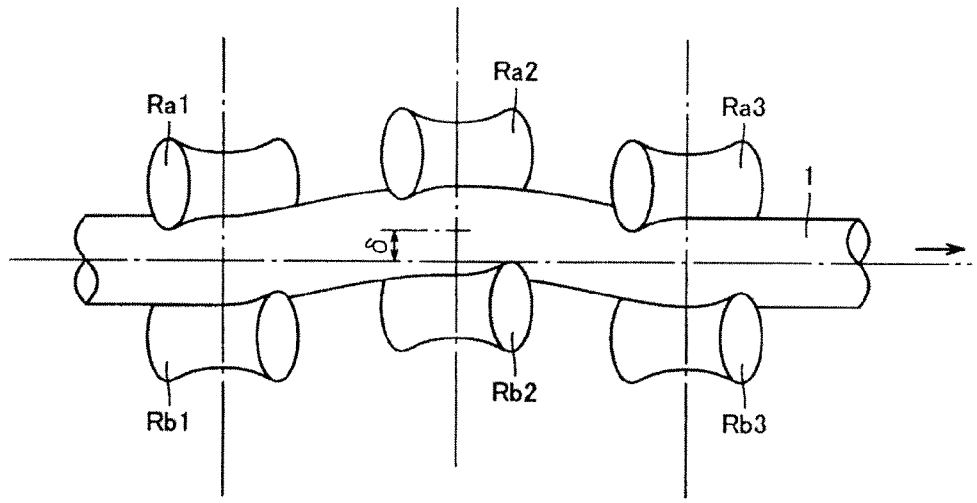
FIG. 5 is a view explaining an offset amount of roll straightening setting conditions.

In the straightening process of the present invention, it is assumed that the tube is straightened using the roll straightening machine in which the plural drum type straightening roll pairs each are disposed, the rolls of each pair being vertically opposed to each other, in a manner such that directions of the rotating axes of rolls of each pair are horizontally oppositely diverted so as to horizontally cross. The straightening process of the present invention is at least three pairs of straightening rolls located on the outlet side of the roll straightening machine. The reason why the straightening process of the present invention is intended to the final three-stand straightening rolls on the outlet side is that an arc R corresponding to curvature radii formed by three points is to be obtained in order to define the later-described η.

In the straightening process of the present invention, it is necessary that each roll of the three pairs of straightening rolls on the outlet side of the roll straightening machine be made of elastic material in which at least the outer layer portion of the roll main body has the hardness Hs (hereinafter referred to as hardness Hs) of 50 to 100 in the spring hardness test (A type) defined by JIS K 6301.

Since proper elasticity is imparted to the outer layer portion of the straightening roll by use of the elastic material in the outer layer portion of the straightening roll, the dimensional fluctuation in the tube caused by abrasion/wear of the straightening roll is decreased compared with the conventional straightening roll whose outer layer portion is made of metal.

The reason why the range of the hardness Hs of the elastic material is defined is that the tube bends can be insufficiently corrected when the elastic material has the hardness Hs of 50 or less and the dimensional fluctuation in the tube is increased after the straightening when the hardness Hs is not less than 100.

Accordingly, the tube bends are corrected by controlling the hardness Hs within the range of 50 to 100, which allows the dimensional fluctuation in the tube to be suppressed after the straightening to enhance the S/N ratio in the eddy current test from the tube inside.

The straightening roll used in the present invention can be made of any elastic material whose hardness Hs falls within a defined range, and material thereof is not particularly limited. Preferably urethane rubber having excellent wear-resistant properties is used as the elastic material.

In the bend correction of the heat transfer tube, the application of the straightening roll in which at least the outer layer portion is made of elastic material can improve an S/N ratio to a certain level in an eddy current test from the tube inside while the bend correction accuracy is ensured. In order to obtain the heat transfer tube having a further improved S/N ratio, it is necessary that the setting conditions of the straightening roll, particularly an offset amount be properly set in the straightening. The offset amount δ can be indicated by η which is imparted to the tube during the roll straightening process.

Accordingly, in the straightening process of the present invention, it is necessary that the offset amount be imparted to the tube in three pairs of straightening rolls on the outlet side such that η defined by the following equation (1) ranges from $1.0 \times 10^{-3}$ to $1.5 \times 10^{-3}$, the offset amount being set at three positions along the tube axis where upper and lower straightening rolls of each pair horizontally cross. However, in the following equation, given that d (mm) is the tube outside diameter, L (mm) is the roll stand span of the roll straightening machine, and δ (mm) is the offset amount, a relationship of $R=(δ^2+L^2)/2δ$ holds.

[Formula 1]

$$\eta = \frac{1}{R} \times \left(\frac{d}{2}\right) \quad (1)$$

Figure 6:
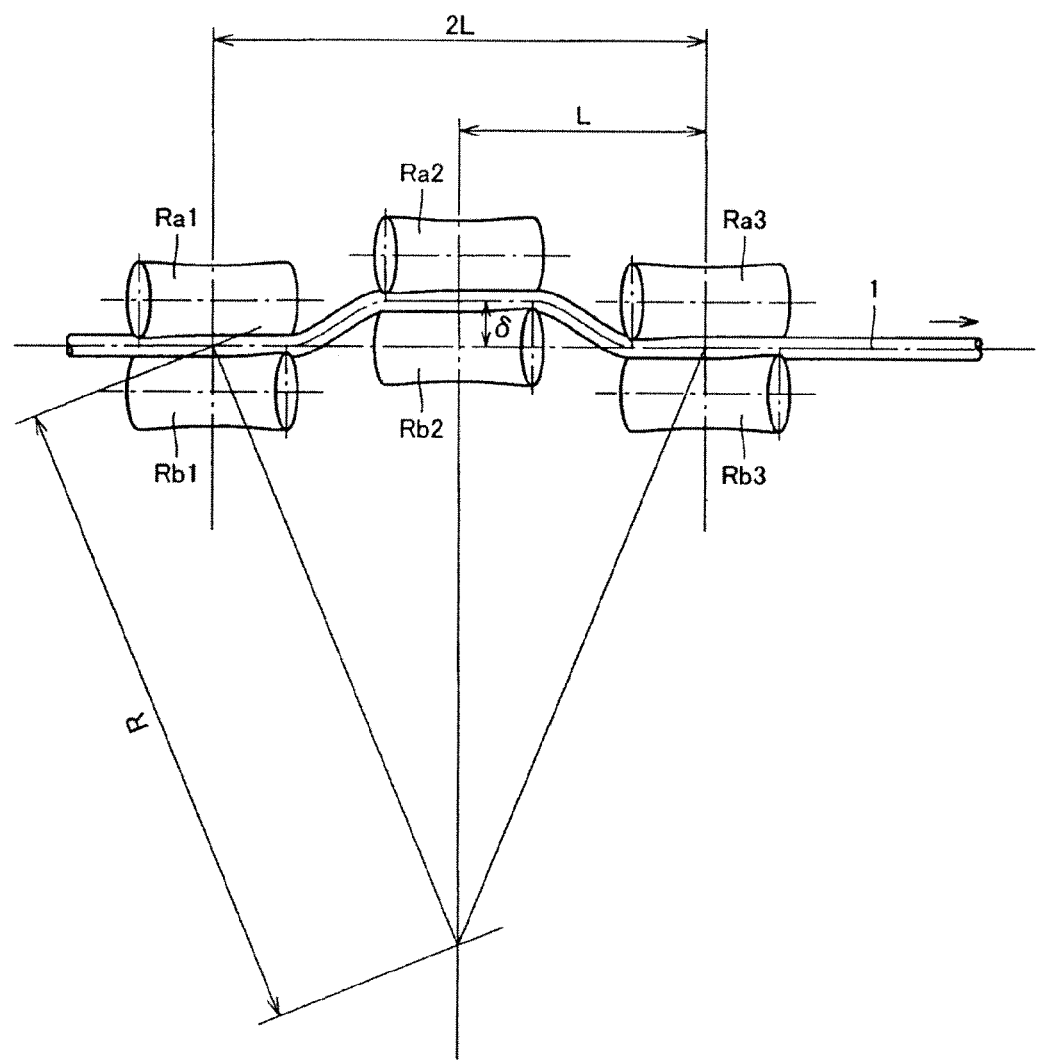
FIG. 6 is a view explaining η defined in the present invention.

FIG. 6 is a view explaining η defined in the present invention. Since η defined in the present invention is obtained from the outside diameter d of the tube to be corrected and the arc R determined by imparting the stand distance L and the offset amount δ, it is necessary to manage η in each tube outside diameter according to the roll straightening machine used.

As shown in FIG. 6, in the configuration of the roll straightening machine provided with the three pairs of straightening rolls having a respective roll stand span L and offset amount δ, the rolls of each pair of which are vertically disposed and opposed to each other in a manner such that axial directions of rolls are horizontally oppositely diverted so as to horizontally cross, the three pairs of straightening rolls are respectively disposed on the inlet side (Ra1 and Rb1), center (Ra2 and Rb2), and outlet side (Ra3 and Rb3) at roll stand spans of L (mm).

The center roll pair (Ra2 and Rb2) is set so as to be vertically deflected from the inlet-side roll pair (Ra1 and Rb1) and outlet-side roll pair (Ra3 and Rb3) which are located at the same level, and the center roll pair (Ra2 and Rb2) is disposed with a predetermined offset amount δ (mm).

In a relationship among an offset amount δ, an arc R, and a roll stand span L, the following equation (3) holds from FIG. 6, so that the offset amount δ (mm) and the arc R can be expressed by the following equations (4) and (5).

$$R^2 - L^2 = (R-δ)^2 \quad (3)$$

$$δ = R - (R^2 - L^2)^{1/2} \quad (4)$$

$$R = (δ^2 + L^2)/2δ \quad (5)$$

In the case where the arc R is expressed by the equation (5), η defined in the present invention is expressed by the equation (1), and it is necessary that the offset amount δ be controlled so as to allow the η to fall within the range of $1.0 \times 10^{-3}$ to $1.5 \times 10^{-3}$.

When η defined in the present invention is set less than $1.0 \times 10^{-3}$, the bend correction accuracy cannot be ensured since the tube bends, particularly the nose bend remains, although the dimensional fluctuation can be decreased after the straightening. That is, although the dimensional accuracy is improved, the tube bends remain due to lack of load applied onto the tube during the straightening. On the other hand, when η defined in the present invention exceeds $1.5 \times 10^{-3}$, the tube bend is corrected, but the dimensional fluctuation in the tube is increased after the straightening since the load applied onto the tube becomes excessive.

Accordingly, in the straightening process of the present invention, the offset amount is imparted to the tube such that η defined in the equation (1) ranges from $1.0 \times 10^{-3}$ to $1.5 \times 10^{-3}$. When η is within the above range, the dimensional fluctuation associated with the bend correction can be suppressed to enhance the S/N ratio in the eddy current test from the tube inside while the tube bend correction accuracy is ensured.

In the straightening process of the present invention, the target value of the S/N ratio is set at 30 or more in the eddy current test from the tube inside. Preferably the offset amount is imparted such that η defined by the equation (1) ranges from $1.0 \times 10^{-3}$ to $1.35 \times 10^{-3}$, since the S/N ratio becomes 50 or more in the eddy current test from the tube inside.

In the straightening process of the present invention, the straightening roll angle θ and crush amount ε, which are the setting conditions, cannot be definitely determined since the appropriate values thereof depend on sizes or materials of the tubes to be corrected, but preferably, the roll angle θ is set within the range of 30° to 33° and the crush amount ε is set within the range of 2 to 3.5 mm in each roll pair.

In the straightening process of the present invention, there is no particular limitation to the method for producing the tube to be corrected. However, the more the tube has excellent dimensional accuracy before the straightening, the less the dimensional fluctuation in the tube such as the ovality becomes after the straightening, thereby enhancing the S/N ratio in the eddy current test from the tube inside. Therefore, it is preferable that in producing the tube to be corrected, the cold rolling is performed plural times with a reduced reduction rate for each rolling pass, or cold drawing is performed using the high-pressure drawing machine.

The production method of the present invention is characterized in that at least final roll straightening in the tube production steps is performed by the straightening process of the present invention. Accordingly, the production method of the present invention is suitable for the heat transfer tube such as the nuclear power steam generator and heat exchanger like feed water heater etc. in which the eddy current test from the tube inside is required.

EXAMPLES

An effect of the straightening process of the present invention will be described with reference to examples. The seven-roll (2-2-2-1) type straightening machine shown in FIG. 1 was used as the roll straightening machine, and the roll covered with the urethane resin having the spring type hardness Hs of 95 was used for each of the outlet-side three pairs of straightening rolls.

The Ni-base alloy of ASME SB-163 UNS NO 6690 was used as testing material, and the tubes having the finished dimension comprising an outside diameter of 19.14 mm, a wall thickness of 1.125 mm and a length of 10000 mm (hereinafter simply referred to as "19φ") and the finished dimension comprising an outside diameter of 16.03 mm, a wall thickness of 1.0 mm and a length of 10000 mm (hereinafter simply referred to as "16φ") obtained through the cold drawing with the high-pressure drawing machine was prepared.

In the roll straightening of the prepared testing material, the roll stand span L of the roll straightening machine was set at 350 mm. In the setting conditions, the roll angle θ and the crush amount ε were kept constant, the offset amount δ was varied within the range of 6 mm to 11 mm to change η within the range of $0.78 \times 10^{-3}$ to $1.72 \times 10^{-3}$. Tables 2 and 3 show the specific setting conditions.

After the roll straightening of the test material, the remaining bends were visually inspected, the eddy current test from the tube inside was performed, and the S/N ratio was assessed at that time.

Table 2 shows the inspection result of the remaining bends and the assessed S/N ratio when the 19φ material is used as the test material. The evaluation criteria of the remaining bends and the S/N ratio shown in Table 2 were the same as those in Table 1.

TABLE 2

| | Test No. | H (×10³) | Arc R(mm) | Offset amount δ (mm) | S/N ratio | Remaining Bends | Crush amount ε (mm) | | Roll angle θ (°) | |
|---|---|---|---|---|---|---|---|---|---|---|
| Comparative example | 1 | *0.94 | 10211.330 | 6 | 78 | x | Inlet side | 2.5 Inlet side | Upper side | 32.0 |
| Inventive example | 2 | 1.19 | 8063.011 | 7.6 | 80 | ○ | | | Lower side | 32.2 |
| | 3 | 1.25 | 7660.250 | 8 | 66 | ○ | Center | 2.7 Center | Upper side | 32.0 |
| | 4 | 1.41 | 6810.056 | 9 | 40 | ○ | | | Lower side | 31.0 |
| Comparative example | 5 | *1.56 | 6130.000 | 10 | 21 | ○ | Outlet side | 2.6 Outlet side | Upper side | 32.0 |
| | 6 | *1.72 | 5573.682 | 11 | 15 | ○ | | | Lower side | 31.5 |

Note 1)
The sign "*" in the table means that the value is out of the range defined in the present invention.
Note 2)
The size of the tube to be corrected was set at 19.14 mm × 1.125 mm × 10000 mm, and ASME SB-163 UNS NO 6690 was used as test material.

Table 2 shows that the Test Nos. 2 to 4 in which η satisfies the range defined in the present invention have satisfactory straightened bends and the S/N ratio of 30 or more which is the target value. In the Test No. 1 in which η is less than the defined range, the S/N ratio is enhanced but the tube bends cannot be straightened. In the Test Nos. 5 and 6 in which η exceeds the range defined in the present invention, the remaining bends are satisfactory but the S/N ratio cannot be enhanced.

Similarly, Table 3 shows the inspection result of the remaining bends and the assessed S/N ratio when the 16φ material is used as the test material. The evaluation criteria of the remaining bends and the S/N ratio shown in Table 3 were the same as those in Table 1. However, the frequency of the eddy current test was changed to 750 kHz.

TABLE 3

| | Sample No. | η (×10³) | Arc R(mm) | Offset amount δ (mm) | S/N ratio | Remaining Bends | Crush amount ε (mm) | | Roll angle θ (°) | |
|---|---|---|---|---|---|---|---|---|---|---|
| Comparative example | 1 | *0.78 | 10211.330 | 6 | 87 | x | Inlet side | 2.7 Inlet side | Upper side | 32.0 |
| | 2 | *0.99 | 8063.011 | 7.6 | 91 | x | | | Lower side | 32.0 |
| Inventive example | 3 | 1.05 | 7660.250 | 8 | 87 | ○ | Center | 3.0 Center | Upper side | 32.0 |
| | 4 | 1.18 | 6810.056 | 9 | 88 | ○ | | | Lower side | 31.0 |
| | 5 | 1.31 | 6130.000 | 10 | 65 | ○ | Outlet side | 3.0 Outlet side | Upper side | 32.0 |
| | 6 | 1.44 | 5573.682 | 11 | 32 | ○ | | | Lower side | 31.0 |

Note 1)
The sign "*" in the table means that the value is out of the range defined in the present invention.
Note 2)
The size of the tube to be corrected was set at 16.03 mm × 1.0 mm × 10000 mm, and ASME SB-163 UNS NO 6690 was used as the material.

Table 3 shows that the Test Nos. 3 to 6 in which η satisfies the range defined in the present invention have satisfactory straightened bends and the S/N ratio of 30 or more which is the target value. In the samples Nos. 1 and 2 in which η is less than the defined range, the S/N ratio is enhanced but the tube bends cannot be straightened.

Figure 7:
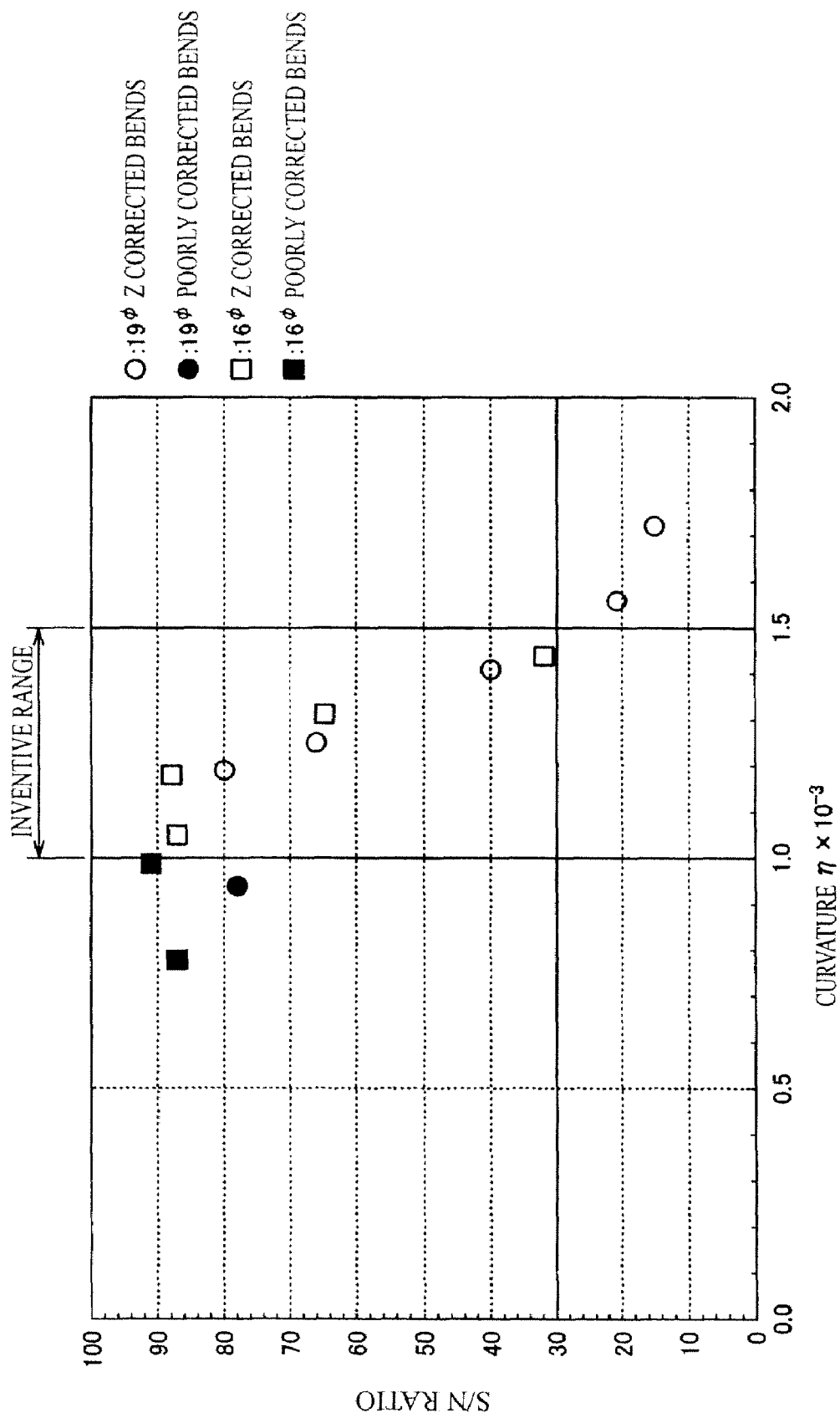
FIG. 7 is a graph showing a relationship between η obtained in examples and S/N ratios in an eddy current test from inside.

FIG. 7 is a view showing a relationship between η obtained in the Test materials and the S/N ratio in the eddy current test from inside. In both Test materials made of the 19φ material and 16φ material, it is confirmed that the remaining tube bends are not observed, and the S/N ratio can be enhanced to 30 or more while the bend correction accuracy is ensured, when η is within the range defined in the present invention. Additionally, it is confirmed that the tube dimension has little influence on the relationship between η and the S/N ratio in the eddy current test from the tube inside when the outside diameter is not more than 30 mm in the finished dimension of the heat transfer tube.

INDUSTRIAL APPLICABILITY

In the tube bend straightening process of the invention, the outer layer portion of the straightening roll is made of elastic material, and the offset amount is appropriately set. Therefore, while the tube bend correction accuracy is ensured, the generation of the ovality or the like associated with the bend correction can be suppressed to enhance the S/N ratio in the eddy current test from the tube inside, which allows the inspection efficiency to be improved.

Accordingly, the heat transfer tube can be used with high reliability, since the excellent quality accuracy can be ensured in the heat transfer tube such as the steam generator and the heat exchanger like the feed water heater etc. used in the thermal or nuclear power plant.

What is claimed is:

1. A tube straightening process using a roll straightening machine in which drum type straightening roll pairs are disposed, the rolls of each pair being vertically opposed to each other, in a manner such that directions of rotating axes of rolls in each pair are horizontally oppositely diverted so as to horizontally cross, wherein:

in at least three pairs of straightening rolls on an outlet-side of the roll straightening machine, at least an outer layer portion of a roll main body is made of elastic material having spring type hardness Hs (JIS K 6301 A type) of 50 to 100, and an offset amount is imparted to a tube engaged in the three pairs, at least, of straightening opposing rolls on the outlet side such that η defined by the following equation (1) ranges from $1.0 \times 10^{-3}$ to $1.5 \times 10^{-3}$, the offset amount being set at three positions tube axis where the upper and lower rolls of each pair horizontally cross

[Formula 1]

$$\eta = \frac{1}{R} \times \left(\frac{d}{2}\right) \quad (1)$$

where a relationship of $R = (\delta^2 + L^2)/2\delta$ holds, given that d (mm) is a tube outside diameter, L (mm) is a roll stand span of the roll straightening machine, and δ (mm) is an offset amount.

* * * * *